United States Patent
Frei et al.

(10) Patent No.: US 11,667,439 B2
(45) Date of Patent: *Jun. 6, 2023

(54) SYNTHETIC MESH REINFORCED MULTILAYER MATERIAL AND BAGS MADE THEREFROM

(71) Applicant: Volm Companies, Inc., Antigo, WI (US)

(72) Inventors: Robert Frei, Deerbrook, WI (US); Corbett Hefner, Alamosa, CO (US)

(73) Assignee: Volm Companies, Inc., Antigo, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,177

(22) Filed: Oct. 12, 2021

(65) Prior Publication Data

US 2022/0097918 A1     Mar. 31, 2022

Related U.S. Application Data

(63) Continuation of application No. 15/275,647, filed on Sep. 26, 2016, now Pat. No. 11,142,375.

(Continued)

(51) Int. Cl.
*B65D 30/06* (2006.01)
*B65D 30/08* (2006.01)
(Continued)

(52) U.S. Cl.
CPC .............. *B65D 31/02* (2013.01); *B32B 5/024* (2013.01); *B32B 5/028* (2013.01); *B32B 5/08* (2013.01);
(Continued)

(58) Field of Classification Search
CPC ........ B65D 29/00; B65D 29/02; B65D 29/04; B65D 31/02; B32B 5/028; B32B 2439/06
(Continued)

(56) References Cited

U.S. PATENT DOCUMENTS 2,056,804 A   10/1936   Potdevin
2,588,695 A   3/1952   Brady et al.
(Continued)

FOREIGN PATENT DOCUMENTS

EP   0 344 318 A1   12/1989
EP   1 739 220 A1   1/2007
WO   99/15418   4/1999

*Primary Examiner* — Jes F Pascua
*Assistant Examiner* — Nina K Attel
(74) *Attorney, Agent, or Firm* — Boyle Fredrickson S.C.

(57) ABSTRACT

A reinforced multilayer material includes a mesh material covered on at least one side, and possibly both, by a layer of a resinous film material. The mesh material includes filaments that intersect one another, at least some of the filaments being composite filaments having a carrier portion of a relatively high melting point and a bonding portion of a relatively low melting point, the bonding portion of each composite filament being thermally bonded to other filaments at least some points of intersection. The multilayer material has a mass per unit area of less than 9.0 oz/yd² and at least one of a) a bursting strength to mass per unit area ratio of at least 9.0 lbs./(oz/yd²), where bursting strength is measured in accordance with ASTM-D37 86 and b) a breaking elongation of at least 5% in the warp direction when breaking elongation is measured in accordance with ASTM-5034. A bag is provided that is made at least in part from a multilayer material having at least some of the characteristics described above.

18 Claims, 3 Drawing Sheets

Related U.S. Application Data

(60) Provisional application No. 62/232,888, filed on Sep. 25, 2015.

(51) Int. Cl.
| | |
|---|---|
| *B32B 7/12* | (2006.01) |
| *B32B 5/08* | (2006.01) |
| *B32B 27/36* | (2006.01) |
| *B32B 27/12* | (2006.01) |
| *B32B 27/32* | (2006.01) |
| *B32B 5/02* | (2006.01) |
| *B65D 30/20* | (2006.01) |
| *B32B 37/15* | (2006.01) |

(52) U.S. Cl.
CPC ............... *B32B 7/12* (2013.01); *B32B 27/12* (2013.01); *B32B 27/32* (2013.01); *B32B 27/36* (2013.01); *B32B 37/153* (2013.01); *B32B 2262/0253* (2013.01); *B32B 2262/12* (2013.01); *B32B 2307/4023* (2013.01); *B32B 2307/518* (2013.01); *B32B 2307/54* (2013.01); *B32B 2307/581* (2013.01); *B32B 2307/5825* (2013.01); *B32B 2307/718* (2013.01); *B32B 2307/72* (2013.01); *B32B 2307/7265* (2013.01); *B32B 2307/732* (2013.01); *B32B 2439/00* (2013.01); *B32B 2439/06* (2013.01); *B65D 31/10* (2013.01)

(58) Field of Classification Search
USPC .................................................. 383/117, 114
See application file for complete search history.

(56) References Cited

U.S. PATENT DOCUMENTS

| | | |
|---|---|---|
| 3,554,368 A | 1/1971 | Nagel |
| 4,285,998 A | 8/1981 | Thibodeau |
| 4,340,558 A | 7/1982 | Hendrickson |
| 4,661,389 A | 4/1987 | Mudge et al. |
| 5,645,933 A | 7/1997 | Sakazume et al. |
| 5,741,076 A | 4/1998 | Cammack |
| 5,823,683 A | 10/1998 | Antonacci et al. |
| 7,157,126 B2 | 1/2007 | Cosentino et al. |
| 7,803,724 B2 | 9/2010 | Ting et al. |
| 8,227,062 B2 | 7/2012 | Nowak et al. |
| 8,282,539 B2 | 10/2012 | Sharp et al. |
| 8,784,967 B2 | 7/2014 | Frei et al. |
| 8,784,969 B2 | 7/2014 | Landertshamer |
| 9,339,986 B2 | 5/2016 | Frei et al. |
| 9,371,143 B2 | 6/2016 | Hefner et al. |
| 2007/0140600 A1 | 6/2007 | Nowak et al. |
| 2013/0196098 A1 | 8/2013 | Frei et al. |
| 2015/0110423 A1 | 4/2015 | Fox et al. |

SYNTHETIC MESH REINFORCED MULTILAYER MATERIAL AND BAGS MADE THEREFROM

CROSS REFERENCE TO A RELATED APPLICATION

This application is a continuation of U.S. Non-Provisional patent application Ser. No. 15/275,647, filed Sep. 26, 2016, which claims priority under 35 USC § 1.119(e) to U.S. Provisional Patent Application No. 62/232,888, filed Sep. 25, 2015, each of which is entitled SYNTHETIC MESH REINFORCED MULTILAYER MATERIAL AND BAGS MADE THEREFROM, the contents of each of which are incorporated by reference in their entirety.

BACKGROUND OF THE INVENTION

1. Field of the Invention

The invention relates to multilayer materials and, more particularly, relates to a material having one or more layers of a resin film reinforced by a mesh formed from overlapping crossing layers of filaments. The invention additionally relates to bags formed from such a material

2. Discussion of the Related Art

Multilayer materials are used in a variety of applications requiring strength and/or moisture protection. One such application is pet food bags, which typically are formed from three or more layers of paper and possibly a moisture or grease barrier such as a thin layer of a film material and/or an inner clay coating.

A problem associated with such multilayer materials is that their strength is less than optimal for some applications. For example, it is estimated that multiwall paper pet food bags experience a failure rate of about 2% in stores and distribution centers due to puncturing or rupturing when bags are dropped. Failure may occur either at the seams of the bag or in the paper itself. This failure rate is unacceptably high when one considers the effort required to clean up spilled pet food or the potential slipping or tripping hazard associated with spilled pet food. Other multilayer bags, such as those used for human-consumable food, exhibit similar need for improved strength.

Traditional multilayer materials also are resource intensive, meaning substantial quantities of paper or other materials are required to produce each bag because each layer is continuous throughout most or all of the multilayer material.

The need therefore has arisen to provide a multilayer material that exhibits improved strength when compared to prior known multilayer materials.

The need further exists to provide a multilayer material that exhibits improves strength to mass ratios than existing multilayer materials and, thus requires fewer resources than existing multilayer materials for a given application.

The need additionally has arisen to provide bags that are lined with a sealant or moisture barrier and that exhibit improved strength when compared to prior bags.

SUMMARY OF THE INVENTION

In accordance with a first aspect of the invention, a reinforced multilayer material is provided that includes a layer of a synthetic resin mesh material covered on at least one side, and possibly both, by layers of a resinous film material. The open mesh material increases strength, reduces tear propagation, and may, depending on its construction, reduce the potential for slip by reducing the planarity of the outer layer. The open mesh material includes layers of filaments or tapes that intersect one another, at least some of the filaments being composite filaments having a carrier portion of a relatively high melting point and a bonding portion of a relatively low melting point, the bonding portion of each composite filament being thermally bonded to other filaments at at least some points of intersection. The multilayer material has a mass per unit area of less than 9.0 oz/yd$^2$ and at least one of a) a bursting strength to mass per unit area ratio of at least 9.0 lbs./(oz/yd$^2$), where bursting strength is measured in accordance with ASTM-D37 86 and b) a breaking elongation of at least 5% in the warp direction when breaking elongation is measured in accordance with ASTM-5034.

Each layer of film material may be heat-laminated or otherwise applied to a respective surface of the layer of mesh material. The outer layer of film material protects the multilayer material against puncturing. It also should be receptive to extrusion or adhesively lamination to the underling open mesh material layer. It also may serve as a print layer. The inner layer of film material serves as a moisture and/or grease barrier or a sealant layer and provides additional strength. It also may be capable of being extrusion or adhesively laminated to the open mesh material and to the outer layer.

The open mesh material may have a mass per unit area of less than 0.89 oz/yd$^2$ and a breaking strength in at least one of the machine and cross machine directions of at least 20.36 lbs, where strength is measured in accordance with ASTM standard D 5034. In this case, the open mesh material may include first and second layers formed from individual filaments that cross one another at an acute angle, and third and fourth layers that are disposed outside of the first layer and the second layer, respectively, each of the third and fourth layers being formed from individual filaments that extend at least generally in parallel with one another in a machine direction. The filaments of at least the third and fourth layers are composite filaments.

The open mesh material may comprise a non-woven material in which the filaments of each layer lie in a common plane.

Alternatively the open mesh material may comprise a woven material with interwoven filaments.

The multilayer material is not only stronger than multilayer materials used in comparable applications, but also exhibits a much higher strength to weight ratio. As a result, the material can be much lighter than a comparable multilayer paper material used in the same applications. It is estimated that the weight per unit area of multilayer materials constructed in accordance with the invention can be 30% to 40% less than that of comparable strength multilayer paper materials.

In accordance with another aspect of the invention, a bag is provided that is made at least in part from a mesh-reinforced multilayer material having at least some of the characteristics described above. The bag may, for example, be a pet food bag, a bag storing lawn and garden supplies, or humanly consumable food bag. The bag may have front and/or rear surfaces that are formed from the reinforced multilayer material described above and that are sealed to one another at side seams and a bottom seam. This bag also lends itself to being closed by thermal bonding, and also lends itself for the incorporation of ancillary features such as a zipper-type closure or a pour spout. Current state of the art bags in this packaging category, including multilayer paper bags and bags formed from biaxially oriented polypropylene (BOPP), do not thermally bond well.

The bag may have first and second sidewalls, a top and a closed bottom. At least a portion of at least the first sidewall is formed at least in part from the multilayer material.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Exemplary embodiments of the invention are illustrated in the accompanying drawings, in which like reference numerals represent like parts throughout, and in which.

DETAILED DESCRIPTION

Figure 1:
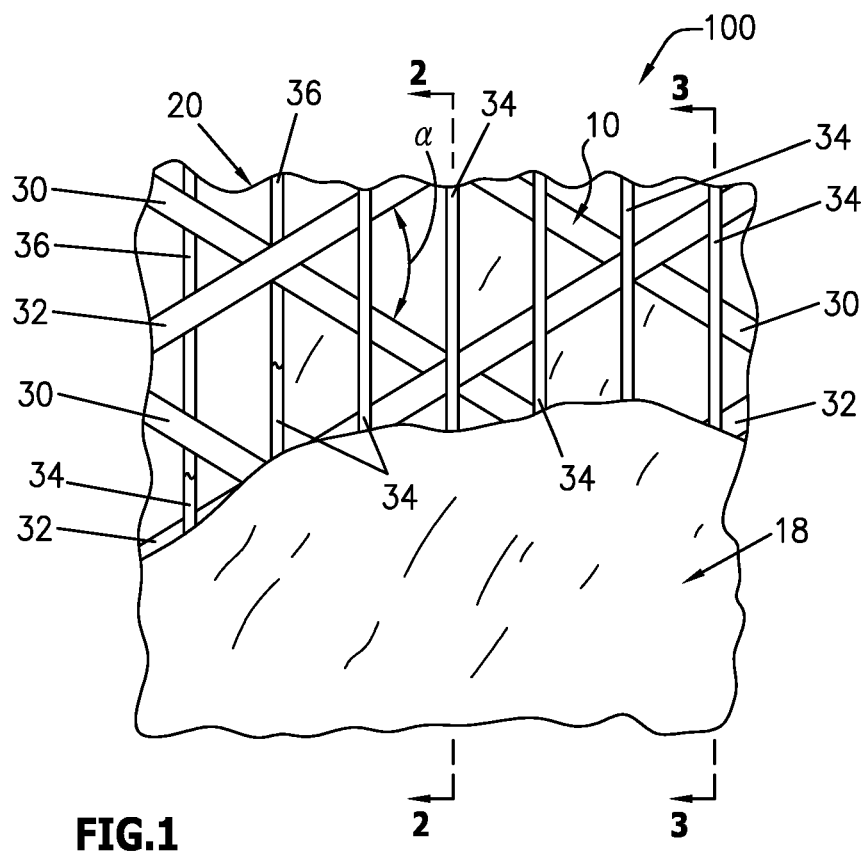
FIG. 1 is a somewhat schematic partially cutaway plan view of a mesh reinforced multilayer material constructed in accordance with an embodiment of the invention.
Figure 2:
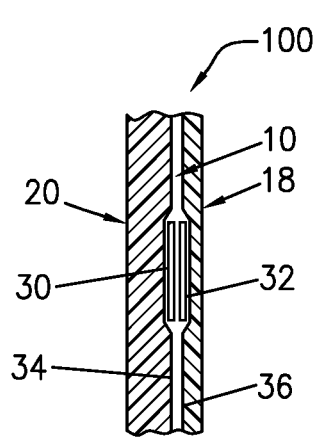
FIG. 2 is a sectional side elevation view taken generally along the lines II-II in FIG. 1.
Figure 3:
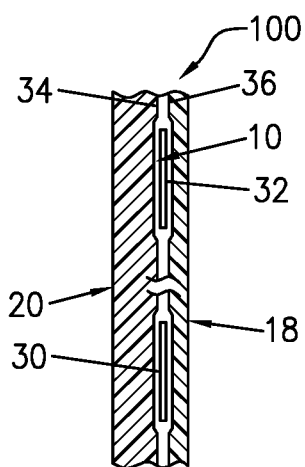
FIG. 3 is a sectional side elevation view taken generally along the lines III-III in FIG. 1.

Referring now to the drawings and initially to FIGS. 1-3, a reinforced multilayer material 100 is illustrated that is constructed in accordance with an embodiment of the invention. Material 100 comprises a center layer 10 of open mesh material, an outer layer 18 formed from a film material, and an inner layer 20 formed from a film material. It should be noted that one of the inner and outer layers 20 and 18 could be eliminated in some applications. In addition, one or more additional layers and/or coatings could be provided on either the inner surface or the outer surface of one or both of the layers 18 and 20. The layers 10, 18, and 20 are adhered to one another such as by ultrasonic welding, adhesive lamination, or by thermal bonding and, most typically, extrusion lamination.

The reinforcing material forming layer 10 is an open mesh material that strengthens the material 100 and reduces tear proportion. Layer 10 also may also serves as a natural anti-slip agent by reducing the planarity of the outer surface of outer layer 18 due to the fact that the spaced filaments of the material add topography to what otherwise would be a featureless outer surface. This slip reduction facilitates stacking and reduces the potential for products falling off stacks during transportation and storage.

The open mesh material that may be constructed, for example, at least generally in conformance with U.S. Pat. No. 8,784,967, the contents of which are incorporated herein by reference in their entirety. The open mesh material includes filaments that intersect each other and that are thermally bonded at at least some of their points of intersection to form a lightweight, strong, dimensionally stable, open mesh material. Possible materials include, but are not limited to, woven fabrics in which the filaments intersect by being interlaced over and under one another, knit fabrics in which the filaments intersect by being inter-looped one around the other, and non-woven fabrics in which the filaments intersect by being layered one on top the other in a crossing fashion. "Intersect" as used herein means that that the intersecting filaments are non-parallel with one another and contact one another at one or more locations. At least some of the filaments could contact and even be bonded to other filaments without intersecting the other filaments. However, filaments may also contact other filaments without intersecting and/or without bonding. For example, some of the filaments could intersect other filaments while being collinear with and lying on top of still other filaments, as is the case with the "stacked" warp filaments described below in conjunction with FIGS. 1-3. In that embodiment, the warp filaments of the upper layer intersect with the weft filaments while being collinear with and lying on top of the underlying warp filaments of the lower layer. In addition, at least some of the filaments could intersect one another without being thermally bonded to one another at their points of intersection, as is the case with the weft filaments described below in conjunction with FIGS. 1-3.

The term "filament" as used herein should be understood to mean a strand of material and should be considered synonymous with "tape", "ribbon", "yarn", or "thread". In order to provide a frame of reference, the terms "warp filaments" and "weft filaments" will be used to describe the crossing filaments. Typically, but not necessarily, the warp filaments will extend at least generally in the "machine direction." It should be understood that those terms are used merely as a frame of reference and not to require that the material be made in any particular manner or have any desired orientation unless otherwise specified. Other directional terms such as "above" and "below" also are used as a frame of reference and should not be construed as limiting.

Some or all of the filaments are "composite filaments." The term "composite filament", as used herein, refers to a filament formed from a composite material having a high melting point "carrier" portion and a relatively low melting point "bonding" portion. The carrier portion also is preferably, but not necessarily, of a higher density than the bonding portion. It forms the structural component of the filament. These composite filaments may be formed from a variety of materials such as a monolayer material formed from a blend of low melting point and high melting point materials. They may also be formed from laminated layers of material or co-extruded layers of material. Composite filaments formed from co-extruded materials may be formed, for example, from a so-called core and sheath material in which a relatively high melting point core is surrounded by at least one layer of a relatively low melting point sheath. A single core may be provided within each sheath. Alternatively, multiple cores may be encapsulated in each sheath. The encapsulated cores may be spaced apart from one another or may contact one another, either by lying side-by-side or by being braided or otherwise intertwined. Alternatively, co-extruded materials could be formed from a relatively high melting point layer having a low melting point layer disposed on one or both sides of it. The term "melting point" as used herein should mean the temperature at which the material can initiate bonding with another material.

Turning again to FIGS. 1-3, layer 10 of this embodiment of an open mesh material formed from layers of intersecting filaments of the type described above is illustrated. The material of this embodiment is a non-woven fabric formed from two mutually crossing groups or layers of elongated weft filaments 30, 32 flanked by lower and upper warp layers of warp filaments 34, 36, respectively. The weft filaments 30 and 32 cross one another at an acute angle or include angle α to form a generally diamond shaped pattern. The angle α may range from about 20° to about 90°. The warp filaments 34 and 36 extend at an acute angle with respect to the crossing filaments and in parallel with one another. They extend in the machine direction in the illustrated embodiment, but could extend in other directions as well. Successive warp filament 34 and 36 may be spaced 2.0 to 20.0 mm on center, and more typically 3.5 to 7.5 mm on center.

In the subject embodiment, the weft filaments 30, 32 of the material 10 are not composite filaments. As such, the weft filaments 30,32 are capable of bonding to one another only to a relatively small extent, if at all. The weft filaments 30, 32 are fixed in their mutual position with the help of lower and upper cover layers of warp filaments 34, 36. As is shown in FIG. 1, the filaments 36 of the lower warp layer and the filaments 34 of the upper warp layer are disposed in-line with each other, so that the weft filaments 30, 32 are fixed between the mutually connected warp filaments 34, 36 without having to join the weft filaments 30, 32 to each other in the region of their crossing points. The layers are thermally bonded and pressed together after or during the laying-down process to fuse the layers together at their points of intersection, hence forming the fabric.

As mentioned above, the open mesh material 10 of this embodiment is a non-woven fabric formed from layers of mutually crossed small filaments each laid in their own planes rather than taking the form of a knit or woven fabric where filaments are inter-looped or interlaced. As a result, simple constructional conditions are obtained with the advantage that, in the crossing regions of the warp filaments and the weft filaments, no inter-looped or interlaced junctions occur which impair the structural integrity of the fabric. In inter-looped or interlaced intersections, the filaments cross each other so that the filaments change planes. This change in planes of the filaments at the inter-looped or interlaced junctions creates stress points in the knit or woven fabrics. In the open mesh fabric of this embodiment, stress points are avoided because the warp and weft filaments merely lie flat on each other and can be provided with a very small thickness of between 10 and 35 microns, for example, thus maximizing the fabric's full tensile strength. The fixing of the mutual position of the weft filaments between the warp filaments ensures a heat-seal connection of the two warp layers to each other and of the warp layers to the interposed weft layers. The weft and warp filaments thus are tightly bound in a non-displaceable manner. The thermal treatment of the fabric also ensures that the open mesh fabric is subjected to only very low residual shrinkage and/or extensions.

To ensure that the warp filaments 34, 36 can positionally fix the weft filaments 30, 32 in place at their points of intersection via thermal bonding, the filaments 34 and 36 of the warp layers are composite filaments as discussed above. The composite filaments may be formed from any combination of materials described above so long as at least one portion is formed of a higher melting point material than the other portions. In the illustrated embodiment, the filaments 34 and 36 of the warp layers are composite filaments formed from a co-extruded film material having a carrier layer of a relatively high tensile strength and a high melting point and a bonding layer of a relatively low melting point on at least the side of the carrier layer facing the weft filaments 30, 32. The carrier layer and bonding layer of the composite warp filaments 34, 36 of this embodiment comprise a HDPE or a MDPE and a LDPE or a LLDPE, respectively. The weft filaments 30 and 32 of this embodiment are made of a relatively high strength material having a melting point above that of the bonding layer of the warp layer filaments. HDPE is currently preferred, but other materials may be utilized, such as heat sealable polypropylene. The high density material of the weft filaments may, but not necessarily, be coated with a lower-melting point material such as LLDPE to enhance bonding at the points of intersection with the warp layer filaments.

The desired dimensions of the individual filaments may vary significantly depending on several factors, including the composition of the filaments and the intended use of the open mesh material. The warp and weft filaments may, for example, have a thickness of 10-200 microns and more typically 10-35 microns. The filaments 30, 32, 34, and 36 may have a fineness of less than 1,000 Denier and possibly less than 500 Denier. The weft filaments 30, 32 of the illustrated embodiment are considerably wider than the warp filaments 34. 36, but filaments of the same or about the same widths could be used in all layers, if desired. In addition, the weft filaments 30, 32 could be narrower than the warp filaments 34, 36. Each filament may have a width of 1.0 to 8.0 mm, and more typically of 2.0 to 5.0 mm.

Still referring to FIGS. 1-3, the outer layer 18 serves as a print surface for consumer product display purposes and also serves heat barrier. It also can provide a good seal point initiation protection for sealing to the inner layer 20 and the intervening open mesh layer 10. Finally, the ideal film usable in this layer is receptive to extrusion and adhesion lamination to the other layers 10 and 20. Acceptable materials usable inlayer 18 include, but are in no way limited to, polyester terephthalate (PET), bi-oriented polypropylene (BOPP), cast polypropylene (CPP) and polyethylene based film. This layer 18 may have a thickness of 10 micron to 100 micron, and more typically of between 12 microns and 50 microns. The illustrated layer 18 has a thickness of 12 microns. Layer 18 may be extrusion-laminated or otherwise applied to the reinforcing layer 10 either separately or all in one operation with the lamination of inner layer 20.

Still referring to FIGS. 1-3, the inner or sealant layer 20 seals materials beneath or inside of the layer from materials above or outside of the layer. Layer 20 serves to add puncture and tear propagation resistance and strength to the material 100. When the multilayer material 100 is used in a bag, the inner layer 20 serves as a moisture and contamination barrier between materials in the bag and the environment and vice versa. This layer may have a thickness of, for example, 25-200 microns and more typically of between 75-130 microns, and most typically of between 90 microns and 135 microns. It also preferably is capable of secured to the open-mesh layer 10 and the outer layer 18 by extrusion-lamination or even adhesive lamination.062. Materials suitable for this layer include, but are in no way limited to, a co-ex film with an MLLDPE seal surface and a core for strength properties.

Figure 4:
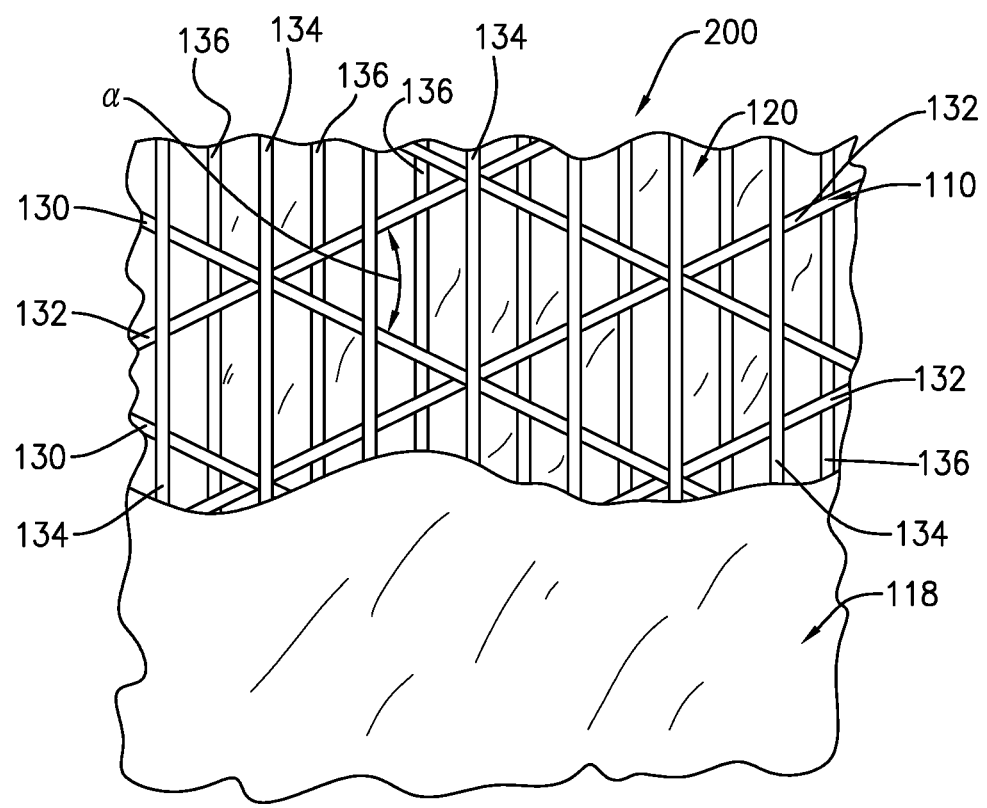
FIG. 4 is a somewhat schematic partially cutaway plan view of a mesh reinforced multilayer material constructed in accordance with another embodiment of the invention.

Turning now to FIG. 4, a second embodiment of a reinforced multilayer material layer 200 produced in accordance with the disclosure is illustrated. The material 200 of this embodiment, like the material 100 of the first embodiment, comprises a layer 110 of a non-woven fabric that is laminated between an outer protective layer 118 and an inner sealant layer 120. Layers 118 and 120 may be identical to the respective layers 18 and 20 described above in conjunction with FIGS. 1-3. Layer 110 of this embodiment is formed from a material formed from two mutually crossing groups of weft filaments 130, 132 which are fixed in their mutual position by being thermally bonded to upper and lower cover layers or warp layer filaments 134, 136. The weft filaments 130 and 132 cross one another at an acute angle to produce a diamond shaped pattern. The filaments 134 or 136 of each warp layer are spaced, parallel filaments extending in the machine direction. The filaments 134 and 136 of the warp layers are composite filaments as discussed above in conjunction with the first embodiment.

The material of the layer 110 of this embodiment differs from the material of the layer 10 of the first embodiment in that the weft filaments 130 and 132 are also composite filaments. All composite filaments 130, 132, 134, and 136 of the illustrated embodiment are made from the same composite material, but it is to be understood that the filaments 130 and 132 of the weft layers could be made from a different composite material than the filaments 134, 136 of one or both of the warp layers. The illustrated composite filaments are formed from a layered co-extruded material, but could be formed, for example, from blended material, a laminated material, or a braided or intertwined material.

Each of the illustrated composite filaments 130-136 of this embodiment comprises a tri-layer co-extruded material. That material has a center, relatively high melting point carrier layer that is flanked by upper and lower bonding layers of a relatively low melting point material. The layers of this material may be formed from any combination of materials described above so long as the carrier portion is formed of a higher melting point material than the bonding portion(s).

The composite weft filaments 130, 132 of this embodiment are positively bonded to both the warp filaments 134 and 136 and to each other at their points of intersection. As a result of this configuration, the filaments of all fabric layers are bound to each other at all points of intersection by the melting and re-hardening of bonding layer material. Since the fabric strength in the cross machine direction is dependent primarily on the aggregate strength of the bonds, the positive weft filament to weft filament bond results in a higher material strength in the cross machine direction than is present in a material in which the weft filaments are not made from a composite material (assuming that all other characteristics of the fabric, including filament thickness, filament density, filament composition, etc., are the same).

The fabric layer 200 illustrated in FIG. 4 also differs from the fabric illustrated in FIGS. 1-3 in that the lower warp layer filaments 136 are offset from the upper warp layer filaments 134. This arrangement provides more points of intersection in a given area of the fabric for bonding, albeit with less material being available for bonding at any given point of intersection. It is also flatter than a comparable "stacked" material such as then shown in FIGS. 1-3 and is more easily sealed to other materials without perforation, rendering it better suited as a reinforcing layer in a multilayer material.

Tests have proven that mesh reinforced multilayer materials constructed in accordance with the invention exhibit superior burst and tear strength when compared to typical prior art multiwall paper materials. The tested materials can be characterized as follows:

BOPP: A single layer of a BOPP typically used in bags.

Multiwall: A tri-layer paper material formed from three layers of paper, the outer layer of which is coated with clay as a moisture and grease barrier.

T2525.385: A reinforced multilayer material constructed in accordance with the invention. The mesh layer was made from an alternating structure as shown generally in FIG. 4. The warp filaments 134 and 136 were spaced 0.24 in. apart in each layer. Each warp filament was 0.087 in. wide. The included angle between the intersecting weft filaments 130 and 132 was 30°. Each weft filament 30 or 32 was 0.150 in. wide. The resulting open mesh material had a mass per unit area of 0.62 oz/yd$^2$. The protective outer layer 18 was PET, having a thickness of 12 microns. The inner "sealant" layer 20 was MLLDPE, having a thickness of about 95 microns.

T2325.525: A material that is generally the same as the T2525.385 material except for the fact that the inner sealant layer had a thickness of 135 microns as opposed to 95 microns.

T2325.385: A material that is generally the same as the T2525.385 material except for the fact that the inner sealant layer was reformulated to increase the bondability of the extrudate to the mesh, hindering delamination or, stated another way, making it more difficult to peel the layers apart.

T2325.525: A material that is generally the same as the T2325.385 material except for the fact that the inner sealant layer had a thickness of 135 microns as opposed to 95 microns.

The test results are summarized in Tables 1 and 2 below, in which:

MD equals "machine direction" or vertically along the page in FIGS. 1 and 4. MD can also be spoken in terms of "warp" direction;

CD equals "cross machine direction" or horizontally along the page in FIGS. 1 and 4. CD can also be spoken of in terms of "weft" direction or "fill" direction;

Mass per unit area is measure in accordance with ASTM-D3776;

Tensile strength is measured via a grab method in accordance with ASTM-D5034;

Breaking elongation is measured via a grab method in accordance with ASTM-5034;

Trapezoidal tear strength is measured in accordance with ASTM-D5587, Opt #1;

Tear strength is measure via the "tongue method" in accordance with ASTM-D2261, Opt #1; and Bursting strength is measured in accordance with ASTM-D3786.

TABLE 1

Material Characteristics

| Description | Mass/Area (oz/yd²) ASTM-D3776 | Tensile Strength Grab Method (lbs.) ASTM-D5034 | Breaking Elongation Grab Method (%) ASTM-5034 | Tear Strength Trapezoid (lbs.) ASTM-D5587, Opt #1 | Tear Strength Tongue Method (lbs.) ASTM-D2261, Opt #1 | Bursting Strength (psi) ASTM-D3786 |
|---|---|---|---|---|---|---|
| BOPP | 3.17 oz./sq-yd | Warp: 148 Weft: 172 | Warp: 16.7% Weft: 17.9% | Warp: 48 Weft: 23 | Warp: 31.7 Weft: 32.6 | 237 psi |
| Multiwall Paper | 9.53 oz./sq-yd | Warp: 154 Weft: 111 | Warp: 2.6% Weft: 5.4% | Warp: 5 Weft: 8 | Warp: 3.1 Weft: 3.7 | 80 psi |
| T2325-385 | 5.49 oz./sq-yd | Warp: 73 Weft: 65 | Warp: 39.2% Weft: 22.6% | Warp: 9 Weft: 11 | Warp: 4.3 Weft: 6.3 | 70 psi |
| T2525-385 | 5.39 oz./sq-yd | Warp: 73 Weft: 62 Weft: 58 | Warp: 37.7% Weft: 23.4% Weft: 22.6% | Warp: 7 Weft: 11 Weft: 11 | Warp: 4.8 Weft: 6.9 Weft: 5.8 | 72 psi |
| T2325-525 | 6.45 oz./sq-yd | Warp: 86 Weft: 70 | Warp: 42.7% Weft: 22.9% | Warp: 11 Weft: 13 | Warp: 5.9 Weft: 9.1 | 80 psi |
| T2525-525 | 6.37 oz./sq-yd | Warp: 79 Weft: 71 Weft: 68 | Warp: 38.8% Weft: 24.3% Weft: 25.1% | Warp: 10 Weft: 12 Weft: 14 | Warp: 5.8 Weft: 8.3 Weft: 7.5 | 82 psi |

TABLE 2A

Material Characteristics

| Description | | Mass/Area (oz./yd²) | Tensile Strength (lbs.) | Strength to Mass Ratio (lbs./(oz/yd²)) | Tear Strength Trapezoidal (lbs.) |
|---|---|---|---|---|---|
| BOPP | Warp | 3.17 | 148 | 46.69 | 48 |
| | Weft | 3.17 | 172 | 54.26 | 23 |
| Multiwall | Warp | 9.53 | 154 | 16.16 | 5 |
| | Weft | 9.53 | 111 | 11.65 | 8 |
| T2325-385 | Warp | 5.49 | 73 | 13.30 | 9 |
| | Weft | 5.49 | 65 | 11.84 | 11 |
| T2525-385 | Warp | 5.39 | 73 | 13.54 | 7 |
| | Weft | 5.39 | 62 | 11.50 | 11 |
| T2325-525 | Warp | 6.45 | 86 | 13.33 | 11 |
| | Weft | 6.45 | 70 | 10.85 | 13 |
| T2525-525 | Warp | 6.37 | 79 | 12.40 | 10 |
| | Weft | 6.37 | 71 | 11.15 | 12 |

TABLE 2B

Material Characteristics

| Description | | Tear Strength to Mass Ratio (lbs./(oz/yd²)) | Tear Strength Tongue (lbs.) | Tear Strength to Mass Ratio (lbs./(oz/yd²)) | Bursting Strength (lbs.) | Bursting Strength to Mass Ratio (lbs./(oz/yd²)) |
|---|---|---|---|---|---|---|
| BOPP | Warp | 15.14 | 31.7 | 10.00 | 237 | 74.76 |
| | Weft | 7.26 | 32.6 | 10.28 | | |
| Multiwall | Warp | 0.52 | 3.1 | 0.33 | 80 | 8.39 |
| | Weft | 0.84 | 3.7 | 0.39 | | |
| T2325-385 | Warp | 1.64 | 4.3 | 0.78 | 70 | 12.75 |
| | Weft | 2.00 | 6.3 | 1.15 | | |
| T2525-385 | Warp | 1.30 | 4.8 | 0.89 | 72 | 13.36 |
| | Weft | 2.04 | 6.9 | 1.28 | | |
| T2325-525 | Warp | 1.71 | 5.9 | 0.91 | 80 | 12.40 |
| | Weft | 2.02 | 9.1 | 1.41 | | |
| T2525-525 | Warp | 1.57 | 5.8 | 0.91 | 82 | 12.87 |
| | Weft | 1.88 | 8.3 | 1.30 | | |

It thus can be seen that all of the tested multilayer materials constructed in accordance with the invention ("the tested material") exhibit a strength to weight ratio that is commensurate with, and in most cases within 10% of, that found in traditional multiwall paper bags.

It can also be seen that the tested materials are considerably lighter than a multiwall paper material, having a mass per unit area less 9.0 oz/yd², less than 7.5 oz/yd², and even less than 6.5 oz/yd². When tested in accordance with the "trapezoidal" method of ASTM-D5 587, Option 1, the tested materials constructed in accordance with the present invention have a tear strength to mass per unit area ratio in excess of 0.75 lbs./(oz/yd²), in excess of 1.00 lbs./(oz/yd²), and even in excess of 1.50 lbs./(oz/yd²) in the warp or machine direction and in excess of 1.00 lbs./(oz/yd²), in excess of in excess of 1.50 lbs./(oz/yd²), and even in excess of 2.00 lbs./(oz/yd²) in the weft or cross machine direction. When tested in accordance with the "tongue" method of ASTM-D2 261, Option 1, the tested materials have a tear strength to mass per unit area ratio in excess of 0.40 lbs./(oz/yd²), in excess of 0.70 lbs./(oz/yd²), and even in excess of 0.75 lbs./(oz/yd²) in the warp or machine direction and in excess of 0.50 lbs./(oz/yd²), in excess of in excess of 0.80 lbs./(oz/yd²), and even in excess of 1.20 lbs./(oz/yd²) in the weft or cross machine direction. These values are on the order of 2-4 times higher than the same values for a comparable multilayer paper material.

Elasticity of the tested materials in terms of breaking elongation, when measured in accordance with ASTM- 5034, exceeded, 5%, 20%, and even 30% in the warp or machine direction and exceeded 10%, 15%, and even 20% in the cross machine or weft direction. Breaking elongation of the tested materials thus is on the order of 15 times higher than a comparable multiwall paper material in at least one direction and is even considerably higher than a comparable BOPP material.

The test data still further revealed that, when tested in accordance with ASTM-D37 86, the tested materials have a bursting strength to mass per unit area ratio in excess of 9.0 lbs./(oz/yd$^2$), in excess of 11.5 lbs./(oz/yd$^2$), and even in excess of 12.0 lbs./(oz/yd$^2$). The bursting strength to weight ratio of the tested materials thus is on the order of 1.5 times higher than the tested multilayer material.

These differences represent a dramatic improvement and produce several practical advantages. For example, it is estimated that the mass per unit area of multilayer materials constructed in accordance with the invention can be 30% to 40% less than that of comparable multilayer paper materials exhibiting comparable strength characteristics. Commensurately less materials thus need be utilized to produce a comparable bag or other article. Materials constructed in accordance with the invention also experience a breaking elongation that is on the order of 15 times higher than multiwall paper in the warp direction and about 4 times higher in the weft or fill direction. This improved elasticity provides for improved shock absorption capability. When the material is used in bags, the high elasticity improves the ability of bags to survive drops without tearing or rupturing.

Materials constructed in accordance of the present invention also have the advantage of being thermally bondable to themselves. This facilitates production of the materials when compared to multilayer materials incorporating other materials including multilayer paper materials and BOPP, in which the outer reinforcing or inner sealing layers can be attached to the underlying woven material only by adhesion bonding or some other technique. In addition, and also unlike many other multilayer materials incorporating paper or s BOPP, seams in bags or other articles formed from the inventive materials can be formed by heat sealing rather than by sewing or another mechanical operation or rather than by bonding using an adhesive. Bag fill times therefore can be considerably improved. For example, 35 lb. bags constructed from the inventive material can be filled and heat sealed at the top at a rate of 20-25 bags per minute. In contrast, only 12-15 multilayer bags of the same capacity and incorporating paper or BOPP can be filled and sewn at the top per minute. For 5-8 lb. bags, inventive bags can be filled and heat sealed at a rate of 40-50 bags per minute, as opposed to a rate of 20-25 bags per minute for the same-sized bags with sewn tops. Also unlike with multilayer bags incorporating paper or BOPP, secondary mechanisms such as pour spouts ad closure/re-closure mechanism such as zipper can be thermally bonded into bags or other articles formed from these material.

Figure 5:
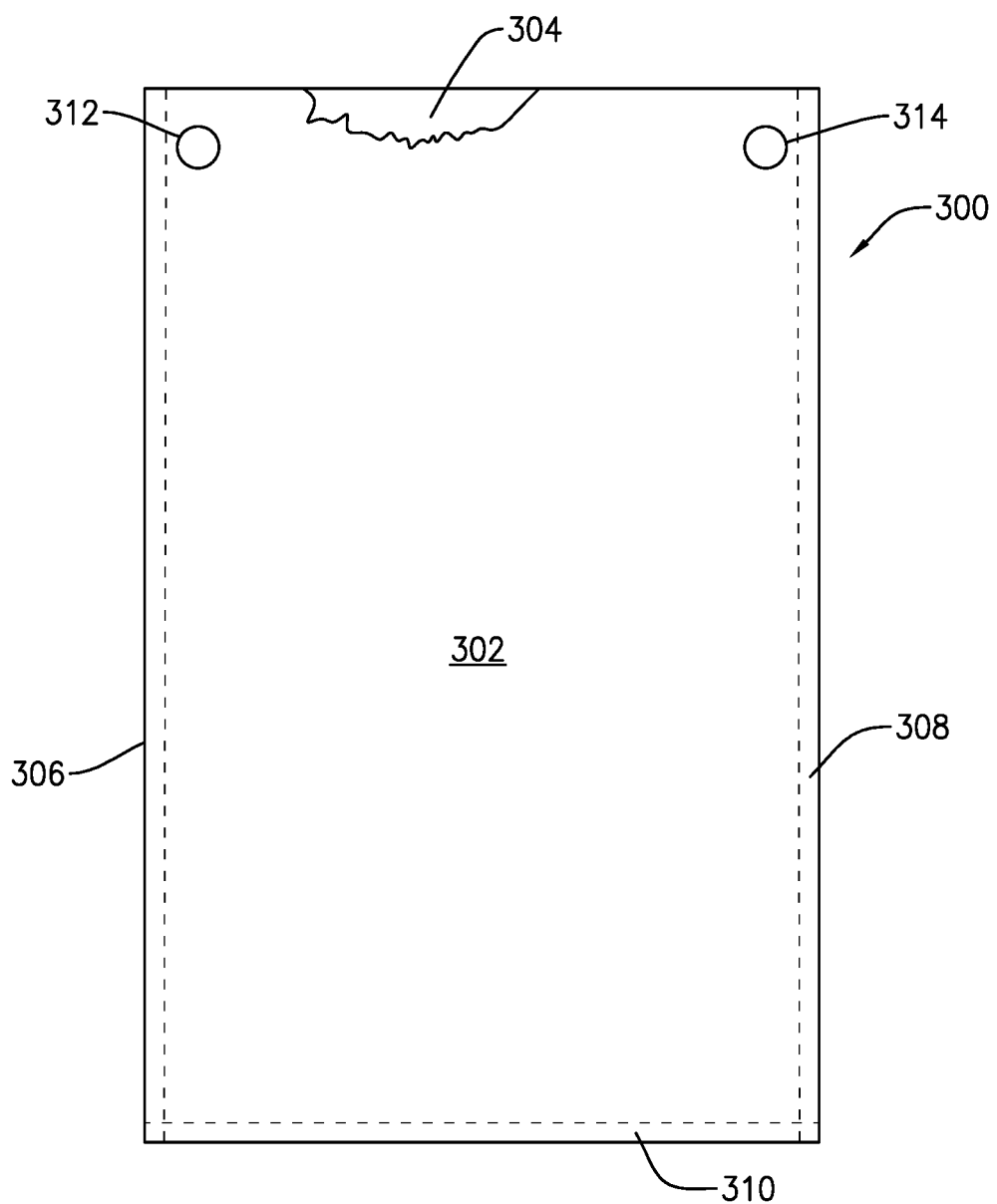
FIG. 5 is a somewhat schematic front elevation view of a bag constructed from the material of FIGS. 1-3 or the material of FIG. 4.

Turning now to FIG. 5, a bag 300 is schematically illustrated that can be produced from a mesh reinforced multilayer material described above. The bag 300 includes first and second sidewalls 302 and 304, at least one of which is formed at least in part from a mesh reinforced multilayer material constructed in accordance with the invention as described above. Both sidewalls 302 and 304 are formed from that material in the illustrated embodiment. The sidewalls 302 and 304 are heat sealed to one another along their side edges at first and second vertically extending seams 306 and 308, and at their bottoms along a horizontally extending seam 310. At least the sides, and possibly the bottom, of the bag 300 may be gusseted to increase its capacity. One such gusseted bag is commonly referred to as a "quad bag" or a "quad seal pouch." Tack seal areas 312 and 314 may be formed in the upper portion of the bag 300 for facilitating re-closure of the bag top for thermal bonding the bags after the filling process or, in the case a bottom-gusseted bag, for fixing the sides of the bottom gusset together. Seal 310 can also be post glued and folded if needed for extra strength. Bag 302 may also be made by VFFS or HFFS processes. The bag 300 also may if desired be "wicketed" by providing openings (not shown) in the upper portion of the bag 300 for hanging unfilled bags from pins in preparation for filling and/or supporting the bags during the filling process. The upper end of the bag 300 could also be provided with a pour spout, a zipper-type closure, etc.

It should be noted that one or both of the side walls 302 and 304 could be made in part from another material, such as woven or non-woven open mesh material or an unreinforced film material. In addition, the seams 306, 308, and 310 could be formed by procedures other than heat bonding, such as by sewing or adhesive glue and folded. In addition, the bag could be a tubular bag or a four panel bag.

The bag 300 is well-suited to store a variety of materials, including pet food, lawn and garden supplies such as fertilizer and even food products for human consumption such as sugar or flour. It may have a capacity of, for example, 35 pounds. Drop tests of comparable paper bags demonstrated that those bags failed after the first one to three drops by bursting or puncturing. The same drop tests of bags of the same size and storing the same materials, produced from a mesh reinforced multilayer material as described above, reveal that these bags could be dropped more than 5, more than 20, and even more than 50 times before failure. Multiwall paper bags of the same capacity, on the other hand, typically cannot survive more than 3 drops before bursting Although the best mode contemplated by the inventor of carrying out the present invention is disclosed above, practice of the present invention is not limited thereto. It will be manifest that various additions, modifications and rearrangements of the aspects and features of the present invention may be made in addition to those described above without deviating from the spirit and scope of the underlying inventive concept. The scope of some of these changes is discussed above. The scope of other changes to the described embodiments that fall within the present invention but that are not specifically discussed above will become apparent from the appended claims and other attachments.

We claim:

1. A reinforced multilayer material comprising:
a layer of an open mesh material having first and second opposed surfaces, the open mesh material including filaments that intersect one another, at least some of the filaments being composite filaments having a carrier portion of a relatively high melting point and a bonding portion of a relatively low melting point, the bonding portion of each composite filament being thermally bonded to other filaments in at least some points of intersection; and
a layer of film material applied to the first surface of the layer of open mesh material,
wherein the multilayer material has a mass per unit area of less than 9.0 oz/yd$^2$ and at least one of a) a bursting strength to mass per unit area ratio of at least 9.0 lbs./(oz/yd$^2$), where bursting strength is measured in accordance with ASTM-D37 86, and b) a breaking elongation of at least 5% in the warp direction when breaking elongation is measured in accordance with ASTM-5034.

2. The reinforced multilayer material of claim 1, wherein the multilayer material has a bursting strength to mass per unit area ratio of at least 11.5 lbs./(oz/yd$^2$).

3. The reinforced multilayer material of claim 2, wherein the multilayer material has a bursting strength to mass per unit area ratio of at least 12.0 lbs./(oz/yd$^2$).

4. The reinforced multilayer material of claim 1, wherein the multilayer material has a breaking elongation of at least 20% in the warp direction.

5. The reinforced multilayer material of claim 4, wherein the multilayer material has a breaking elongation of at least 30% in the warp direction.

6. The reinforced multilayer material of claim 1, wherein the open mesh material has a mass per unit area of less than 0.89 oz/yd$^2$ and a breaking strength in at least one of the machine and cross machine directions of at least 20.36 lbs, where strength is measured in accordance with ASTM standard D 5034.

7. The reinforced multilayer material of claim 6, wherein the open mesh material comprises
first and second layers formed from individual filaments that cross one another at an acute angle, and
third and fourth layers that are disposed outside of the first layer and the second layer, respectively, each of the third and fourth layers being formed from individual filaments that extend at least generally in parallel with one another in a machine direction, and wherein the filaments of at least the third and fourth layers are composite filaments.

8. The reinforced multilayer material of claim 1, wherein the open mesh material comprises a non-woven material in which the filaments of each layer lie in a common plane.

9. The reinforced multilayer material of claim 1, wherein the open mesh material comprises a woven material with interwoven filaments.

10. The reinforced multilayer material of claim 1, wherein the film layer is formed from one of a polyester terephthalate (PET), a bi-oriented polypropylene (BOPP), a cast polypropylene (CPP), and a polyethylene based film.

11. The reinforced multilayer material of claim 1, wherein the film layer has a thickness of 10 microns to 100 microns.

12. The reinforced multilayer material of claim 1, wherein the film layer has a printed outer surface.

13. The reinforced multilayer material of claim 1, wherein the film layer is thermally or adhesively laminated onto the mesh layer.

14. The reinforced multilayer material of claim 1, further comprising a second film layer applied to the second surface of the open mesh material.

15. The reinforced multilayer material of claim 14, wherein the second film layer is capable of serving as a moisture barrier and has a thickness of between 25 microns and 200 microns.

16. A bag comprising:
first and second sidewalls, a top, and a closed bottom, wherein at least the first sidewall is formed entirely from a multilayer material including
a layer of an open mesh material having inner and outer opposed surfaces, the open mesh material including filaments that intersect one another, at least some of the filaments being composite filaments having a carrier portion of a relatively high melting point and a bonding portion of a relatively low melting point, the bonding portion of each composite filament being thermally bonded to other filaments at least some points of intersection,
a first layer of film material applied to the outer surface of the layer of open mesh material, and
a second film layer applied to the inner surface of the open mesh material wherein
the multilayer material has a mass per unit area of less than 9.0 oz/yd$^2$ and at least one of a) a bursting strength to mass per unit area ratio of at least 9.0 lbs./(oz/yd$^2$), where bursting strength is measured in accordance with ASTM-D37 86 and b) a breaking elongation of at least 5% in the warp direction when breaking elongation is measured in accordance with ASTM-5034.

17. The bag of claim 16, wherein the first sidewall is thermally bonded to the second sidewall along a horizontal seam located in the vicinity of the top of the bag.

18. The bag of claim 16, wherein the open mesh material of the multilayer material comprises:
first and second layers formed from individual filaments that cross one another at an acute angle, and
third and fourth layers that are disposed outside of the first layer and the second layer, respectively, each of the third and fourth layers being formed from individual filaments that extend at least generally in parallel with one another in a machine direction, and wherein the filaments of at least the third and fourth layers are composite filaments.

* * * * *